(12) United States Patent
Potter

(10) Patent No.: US 11,518,223 B2
(45) Date of Patent: Dec. 6, 2022

(54) TONNEAU SYSTEM WITH STRETCHABLE COVER

(71) Applicant: Dennis Jay Potter, Midway, UT (US)

(72) Inventor: Dennis Jay Potter, Midway, UT (US)

(*) Notice: Subject to any disclaimer, the term of this patent is extended or adjusted under 35 U.S.C. 154(b) by 0 days.

(21) Appl. No.: 16/217,535

(22) Filed: Dec. 12, 2018

(65) Prior Publication Data

US 2020/0189368 A1 Jun. 18, 2020

(51) Int. Cl.
*B60J 7/10* (2006.01)

(52) U.S. Cl.
CPC ..................... *B60J 7/102* (2013.01)

(58) Field of Classification Search
CPC .... B60J 7/10; B60J 7/102; B60J 7/104; B60P 7/0876
USPC ............. 296/136.03, 100.18, 100.16, 100.15
See application file for complete search history.

(56) References Cited

U.S. PATENT DOCUMENTS

| | | |
|---|---|---|
| 578,522 A | 3/1897 | Preusser |
| 3,167,825 A | 2/1965 | Zoller |
| 3,167,856 A | 2/1965 | Zoller |
| 3,367,347 A | 2/1968 | Smith |
| 3,547,515 A | 12/1970 | Shanok |
| 4,010,573 A | 3/1977 | Andrzejewski |
| 4,042,741 A | 8/1977 | Bright |
| 4,105,814 A | 8/1978 | Eggert |
| 4,126,351 A | 11/1978 | Peteretti |
| 4,232,081 A | 11/1980 | Pullan |
| 4,339,860 A | 7/1982 | Hayashi |
| 4,355,448 A | 10/1982 | Ezaki |
| 4,411,941 A | 10/1983 | Azzola |
| 4,432,166 A | 2/1984 | Weimar |
| 4,617,220 A | 10/1986 | Ginster |
| 4,639,033 A * | 1/1987 | Wheatley .................. B60P 7/04 160/327 |
| 4,643,923 A | 2/1987 | Bernitz et al. |
| 4,647,103 A | 3/1987 | Walblay |
| 4,695,499 A | 9/1987 | Whitener |
| 4,699,837 A | 10/1987 | Bright |
| 4,739,528 A | 4/1988 | Allen |
| 4,745,016 A | 5/1988 | Hashimoto et al. |
| 4,792,179 A | 12/1988 | Stevens |
| 4,830,898 A | 5/1989 | Smith |

(Continued)

FOREIGN PATENT DOCUMENTS

| | | |
|---|---|---|
| FR | 1201381 A | 12/1959 |
| FR | 2864490 A | 7/2005 |
| FR | 2864490 A1 * | 7/2005 |

OTHER PUBLICATIONS

Machine Translation of FR2864490, printed from the EPO website, May 14, 2021.*

(Continued)

*Primary Examiner* — Jason S Morrow
(74) *Attorney, Agent, or Firm* — Thorpe North & Western, LLP; Jed H. Hansen; Brett Davis

(57) ABSTRACT

A tonneau system for a cargo compartment of a vehicle comprises a tonneau frame assembly and a tonneau cover removably connected to the tonneau frame assembly. The tonneau cover comprises an elastic material that allows it to stretch over cargo loaded into the cargo compartment. The tonneau cover exerts a compressive force on the cargo to hold the cargo in place while the vehicle is in motion.

19 Claims, 8 Drawing Sheets

(56) References Cited

U.S. PATENT DOCUMENTS

| | | | |
|---|---|---|---|
| 4,848,828 A | 7/1989 | Hunt | |
| 4,952,442 A | 8/1990 | Warner | |
| 4,982,529 A | 1/1991 | Mesnel | |
| 4,984,191 A | 1/1991 | Cao | |
| 5,040,934 A * | 8/1991 | Ross | B60P 7/0876 296/100.16 |
| 5,085,006 A | 2/1992 | Hayashi et al. | |
| 5,121,960 A | 6/1992 | Wheatley | |
| 5,137,324 A * | 8/1992 | Hershberger | B60J 7/104 289/16.5 |
| 5,152,574 A | 10/1992 | Tucker | |
| 5,251,951 A | 10/1993 | Wheatley | |
| 5,275,458 A | 1/1994 | Barben et al. | |
| 5,431,474 A | 7/1995 | Burkey | |
| 5,472,256 A | 12/1995 | Tucker | |
| 5,540,475 A | 7/1996 | Kersting et al. | |
| 5,655,808 A | 8/1997 | Wheatley | |
| 5,716,176 A * | 2/1998 | Anderson | B60P 7/0876 296/100.16 |
| 5,752,345 A | 5/1998 | Bright et al. | |
| 5,788,315 A | 8/1998 | Tucker | |
| 5,860,691 A | 1/1999 | Thomsen et al. | |
| 5,984,400 A | 11/1999 | Miller et al. | |
| 6,152,664 A * | 11/2000 | Dew | B60P 7/0876 410/100 |
| 6,224,139 B1 | 5/2001 | Weyand | |
| 6,257,647 B1 * | 7/2001 | Ninness | B60J 7/102 160/290.1 |
| 6,527,318 B2 * | 3/2003 | Kolper | B60P 7/04 293/116 |
| 6,619,719 B1 | 9/2003 | Wheatley | |
| 6,726,978 B2 | 4/2004 | Sehr | |
| 6,783,311 B2 * | 8/2004 | Sauerwald | B60P 7/0823 410/116 |
| 6,851,903 B1 * | 2/2005 | Foggy | B60P 7/0876 410/118 |
| 6,889,985 B2 | 5/2005 | Bonds | |
| 7,384,090 B1 | 6/2008 | Weldy | |
| 7,604,282 B2 | 10/2009 | Spencer et al. | |
| 7,621,582 B2 | 11/2009 | Schmeichel et al. | |
| 7,735,881 B2 | 6/2010 | Steffens et al. | |
| 7,815,239 B1 | 10/2010 | Schmeichel et al. | |
| 7,828,361 B1 | 11/2010 | Spencer | |
| 7,905,536 B2 | 3/2011 | Yue | |
| 7,954,876 B2 | 6/2011 | Kosinski | |
| 7,963,585 B2 | 6/2011 | Jones et al. | |
| 8,973,969 B1 | 3/2015 | Potter | |
| 9,061,572 B2 | 6/2015 | Potter | |
| 10,150,602 B1 * | 12/2018 | Gomolski | B65D 65/08 |
| 2003/0057726 A1 * | 3/2003 | Wheatley | B60J 7/102 296/100.18 |
| 2007/0057528 A1 | 3/2007 | Fox et al. | |
| 2007/0257478 A1 * | 11/2007 | Metzikis | B62J 23/00 280/770 |
| 2008/0145172 A1 | 6/2008 | Sturt et al. | |
| 2010/0156137 A1 * | 6/2010 | Jones | B60J 7/104 296/136.03 |
| 2014/0099172 A1 | 4/2014 | Geske | |
| 2015/0102628 A1 * | 4/2015 | Potter | B60J 7/104 296/100.16 |
| 2015/0102629 A1 * | 4/2015 | Potter | B60P 7/0876 296/100.16 |
| 2015/0321544 A1 * | 11/2015 | Costello | B32B 5/02 150/166 |
| 2016/0368426 A1 | 12/2016 | Fugett | |
| 2018/0029454 A1 * | 2/2018 | Freitas | B60J 7/102 |
| 2020/0039337 A1 * | 2/2020 | Shi | B60P 7/04 |

OTHER PUBLICATIONS

Undated Trim-Lok Sewable Upholstery Trim brochure (at least as early as Jul. 2013).

* cited by examiner

TONNEAU SYSTEM WITH STRETCHABLE COVER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to cover systems for cargo areas of vehicles, and more particularly, but not necessarily entirely, to tonneau cover systems and cargo top carriers for vehicles.

2. Description of Related Art

Vehicle, trailer and vehicle top cargo carrier manufacturers supply various models of trailers, vehicles, and cargo carriers that have open beds on which to place cargo for transit. Such truck beds, trailer beds, and cargo carriers typically have limited or no method of protecting cargo from the weather, water or debris. Furthermore, such truck beds, trailer beds, and cargo carriers typically have a limited or no method of securing cargo from movement.

Under one solution to secure and protect cargo in a truck bed or cargo top carrier, the cargo was simply covered with a tarpaulin or tarp. Cords, straps, or bungees were then used to secure the tarp over the cargo and to the sidewalls of the truck bed. However, tarp users objected to the bulky and awkward to handle nature of tarps. For example, tarps often come loose at high speeds and flap away from the cargo they are supposed to protect. Additionally, securing the tarp with cords, straps, or bungees proved difficult and time consuming.

Under another solution to protect cargo in a truck bed, several types of bed enclosures, known as tonneau covers, were designed to cover the truck bed in such a way that small cargo could be protected from the weather. In the past, tonneau covers have been provided with soft and hard covers, as explained below.

Soft Tonneau Covers: A soft tonneau cover is usually made from non-stretchable vinyl or another fabric material that is installed over a truck bed. These covers are versatile, durable, and are available with a lot of different options. They usually come as either snap-on or snap-less covers. Some soft tonneau covers roll up for easy storage near the cab, while others can be removed to provide access to the truck bed.

Hard Tonneau Covers: A hard tonneau cover is a rigid cover that acts much like a hood or trunk over the truck bed. Hard tonneau covers are made of fiberglass, metal, or plastic and come with a wide range of options. Some are folding models with solid panels that fold and stack on themselves, while others are solid, one-piece hinged designs that give a sleek appearance with no seams.

One drawback to previously available soft and hard tonneau covers is that they do not easily expand or stretch to cover cargo higher than the sidewalls of the truck bed or cargo top carrier. That is, previously available tonneau covers limited the height of the cargo that could be placed into the truck bed. Typically, if the cargo was taller than the sidewalls of the truck bed, the tonneau cover had to be removed. Further, tonneau cover manufacturers specifically state that cargo should not come into contact with the covers.

An attempted solution to this "height" problem is disclosed by applicant in his U.S. Pat. Nos. 9,061,572 and 8,973,969. Applicant's solution involved using a foldable tonneau cover with integral straps. This foldable tonneau cover remained folded during normal usage. To secure tall cargo in the truck bed, the foldable tonneau cover unfolded to accommodate cargo taller than the sidewalls of the truck bed. Applicant's foldable tonneau cover, however, proved expensive to manufacture and difficult to use by untrained users.

Another attempted solution to this "height" problem is disclosed in U.S. D689,426 issued to Jaramillo. Jaramillo's solution involves a tarpaulin cover with an integral, web-like elastic cord system. The disadvantages to this tarpaulin cover, however, are many. First, this tarpaulin cover is not fully weather proof as gaps will exist between the sidewalls of the truck bed and the cover. That is, Jaramillo's tarpaulin cover does not fully protect or secure cargo within the pickup bed truck. Second, this tarpaulin cover is complicated and expensive to manufacture with either a very large die or many parts. Lastly, this tarpaulin material is made from an easily tearable non-composite material and the tarpaulin material itself does not appear to stretch.

Thus, there still exists a need in the art for a tonneau cover that easily expands or stretches to accommodate cargo taller than the sidewalls of the truck bed and that is fully weather proof.

The prior art is thus characterized by several disadvantages that are addressed by the present disclosure. The present disclosure minimizes, and in some respects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
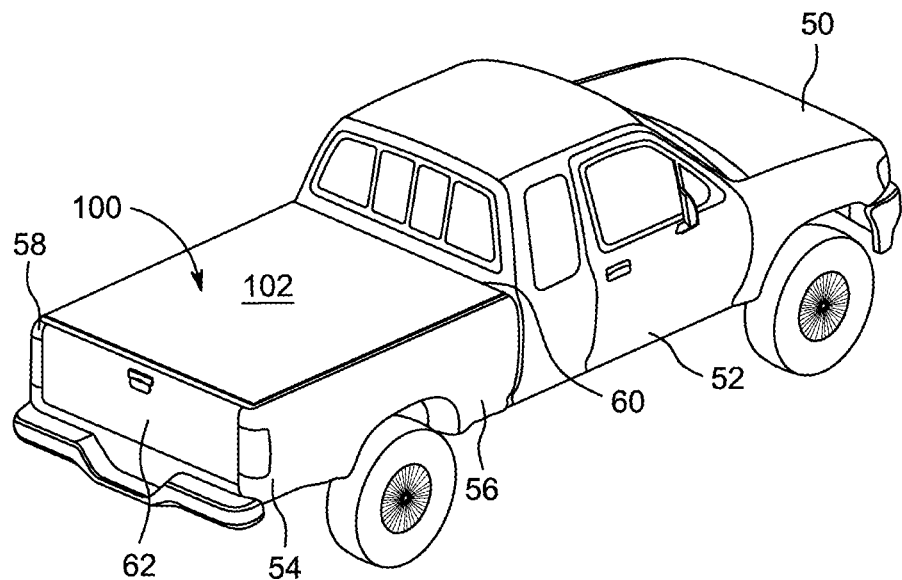
FIG. 1 shows an isometric view of a vehicle utilizing a tonneau cover system installed over the vehicle's cargo bed according to an embodiment of the present disclosure.

For the purposes of promoting and understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

Figure 2:
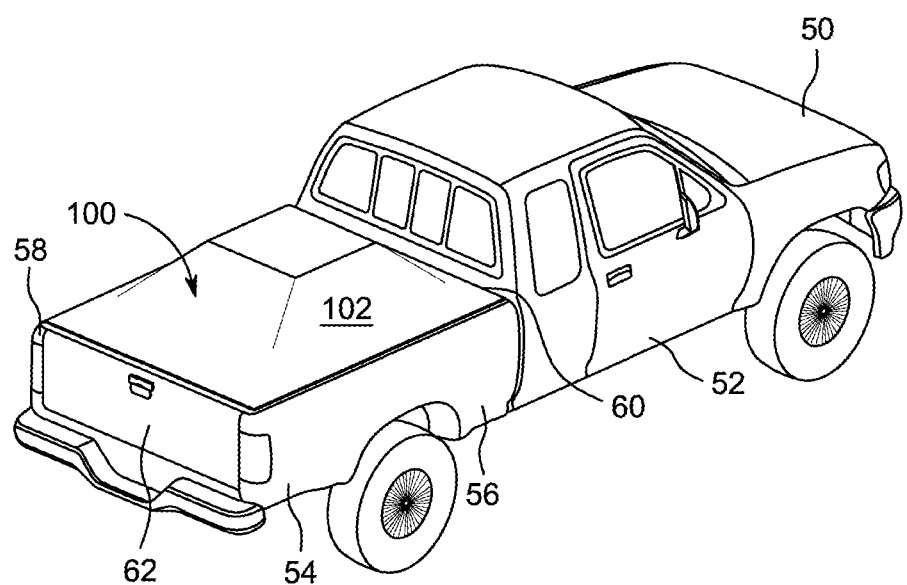
FIG. 2 shows an isometric view of the vehicle depicted in FIG. 1, where the cover of the tonneau system is expanded and stretched to fit over and restrain cargo within the vehicle's cargo bed.

For description purposes herein, the terms "over", "under", "top", "bottom", "front", "rear", "left", "right" relate generally to the vehicle as oriented in FIGS. 1 and 2. That is, "front" is generally in the direction of travel of a vehicle while "rear" is in the opposite direction. "Left" refers to the driver side of a vehicle while "right" refers to the passenger side of a vehicle. It is understood that embodiments of the present invention may assume other various alternative orientations and sequences except where expressly specified to the contrary. Additionally, it is to be understood that the specific details and processes illustrated in the drawings and described in the specifications are simple exemplary embodiments. Hence, specific dimensions, other physical characteristics and materials relating to the embodiments disclosed herein are not to be considered as limiting, unless the claims expressly state otherwise.

Referring now to FIG. 1, a tonneau cover system 100 is shown mounted on a vehicle 50 according to an embodiment of the present disclosure. The vehicle 50 includes a front cab 52 and a truck bed 54. The truck bed 54 may include sidewalls that form a cargo compartment 55 (shown in FIGS. 3, 4, 8 and 9), including opposing sidewalls 56 and 58, a front wall 60 and a rear wall 62 as is known to those having ordinary skill in the art. It will be appreciated that the rear wall 62 may include a tail gate, as is common in most pick-up trucks. It will be further appreciated that while the present disclosure is suited for pick-up trucks, it may be used on trailers, other types of vehicles with uncovered cargo compartments, and vehicle top cargo carriers.

The system 100 includes a tonneau cover 102 that extends over the cargo compartment 55. For example, the cover 102 extends between the tops of opposing sidewalls 56 and 58, the front wall 60 and the rear wall 62. The cover 102 may be water resistant or water proof. It will be appreciated that the cover 102 may be stretched taut over the cargo compartment 55 and fully covers the cargo compartment 55 without gaps between the cover and the sidewalls. That is, the edges of the cover 102 are secured to the top of the sidewalls 56 and 58, the front wall 60 and the rear wall 62 to form a water resistant or water proof seal in a manner that will be explained in detail hereinafter.

Referring now to FIG. 2, where like reference numerals depict like components, the cover 102 is formed of a stretchable material such that when cargo is placed into the cargo compartment 55, the cover 102 stretches over the cargo and above a top of the sidewalls. It will be appreciated that the cover 102 holds the cargo in place due to its elastomeric nature. That is, as the cover 102 attempts to retract to is normal substantially flat position as shown in FIG. 1, the cover 102 itself exerts a compressive force on the cargo to hold it in place. It will be appreciated that the cover 102 fully covers the cargo compartment 55 without gaps between the cover 102 and the sidewalls.

As shown in FIG. 1, the cover 102 remains substantially flat with an empty vehicle cargo bed. Thus, it will be appreciated that the tonneau cover 102 is operable between a stretched position as shown in FIG. 2 and an unstretched or flat position as shown in FIG. 1. In an embodiment of the present disclosure, the cover 102 is characterized by an absence of straps, buckles, webbing and folds.

Figure 3:
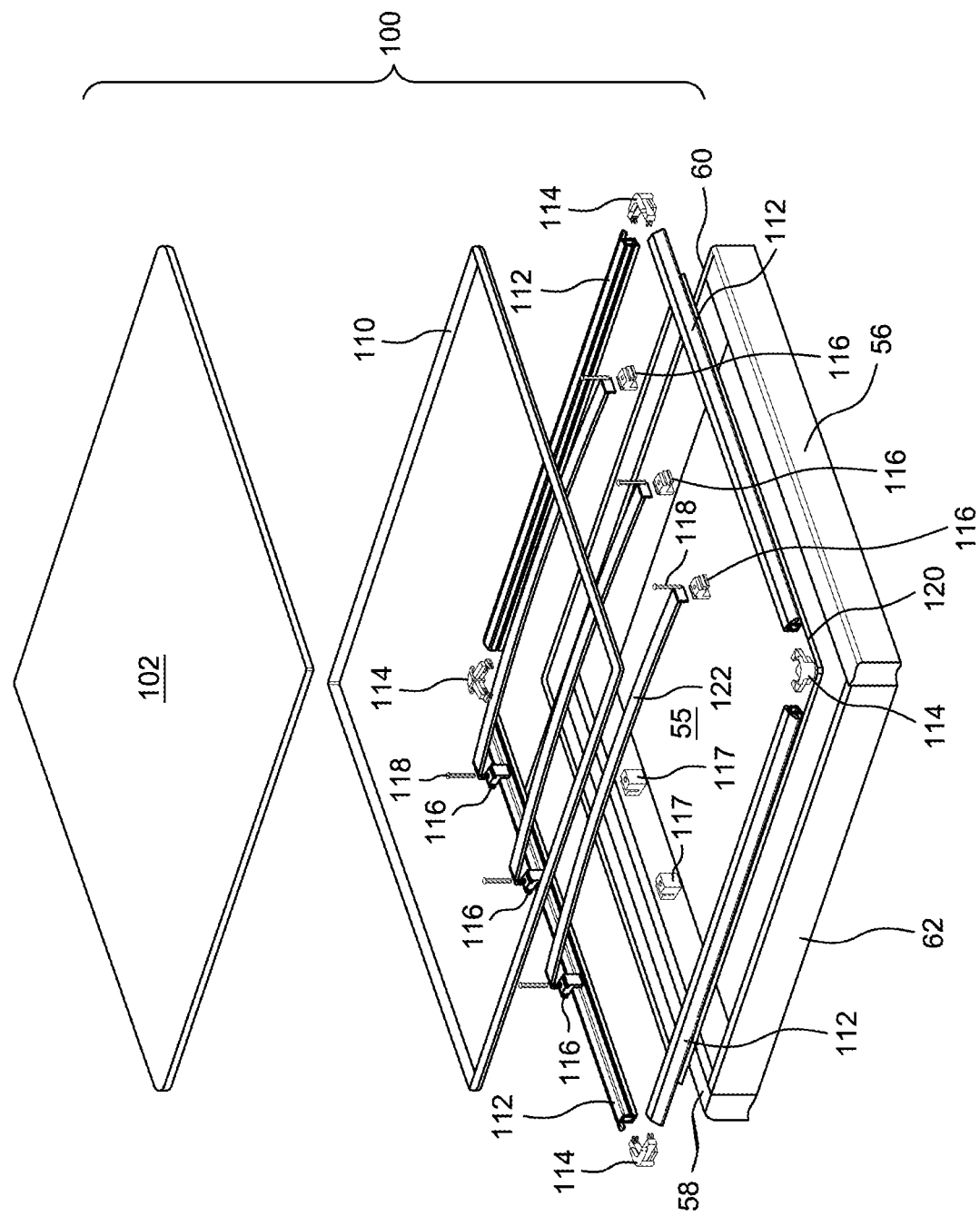
FIG. 3 shows an exploded view of the tonneau cover system of FIG. 1.
Figure 4:
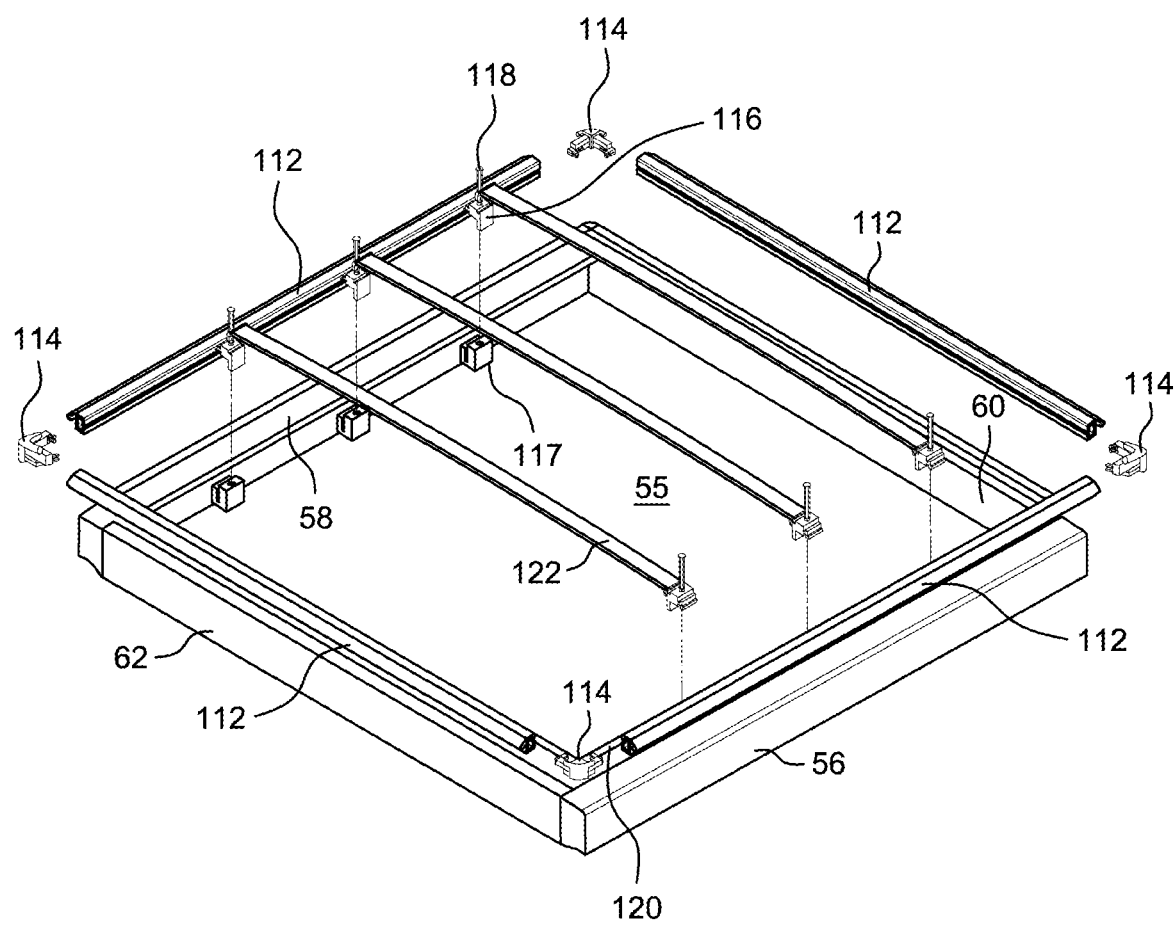
FIG. 4 shows an exploded isometric view of some of the components of the tonneau cover system of FIG. 1.

Referring now to FIGS. 3 and 4, where like reference numerals depict like components, in addition to the cover 102, the tonneau cover system 100 may include a friction fit seal 110, elongated rail members 112, rail frame corners 114, upper clamps 116, lower clamps 117, threaded fasteners 118, a gasket 120, and one or more support bows 122.

Figure 5:
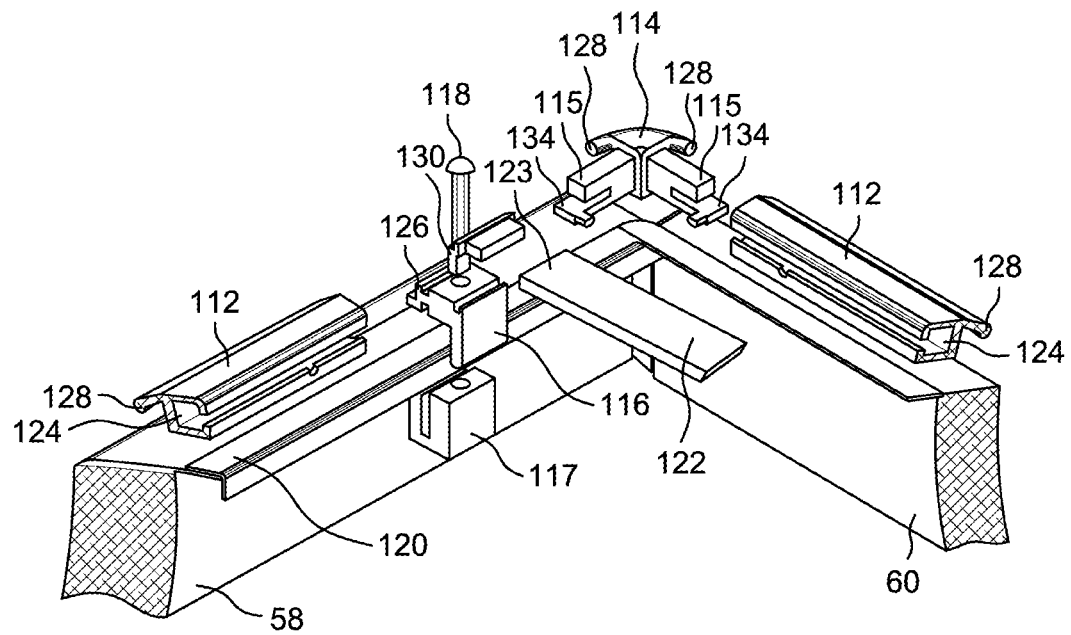
FIG. 5 shows an exploded and fragmentary view of some of the components of a corner assembly of the tonneau cover system shown in FIG. 1.
Figure 6:
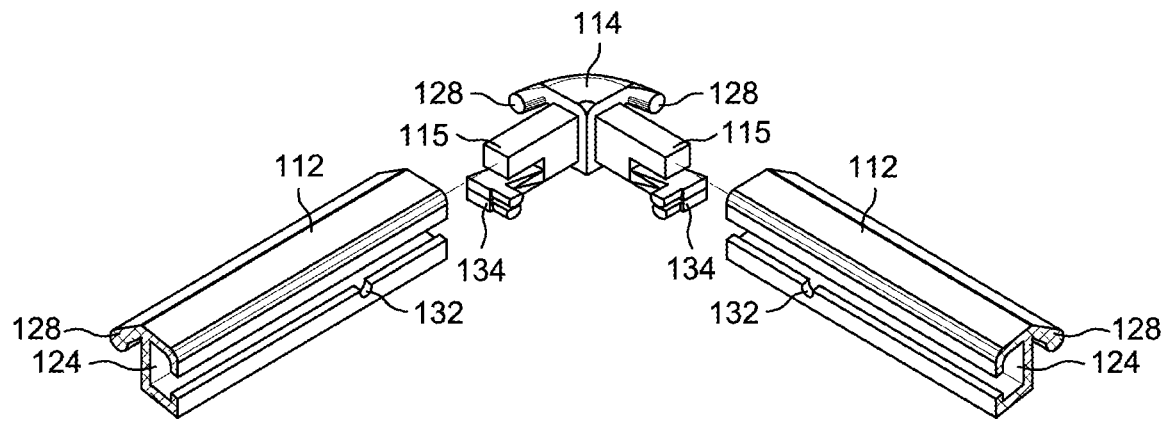
FIG. 6 shows an exploded and fragmentary view of some the components of a corner assembly of the tonneau cover system.
Figure 7:
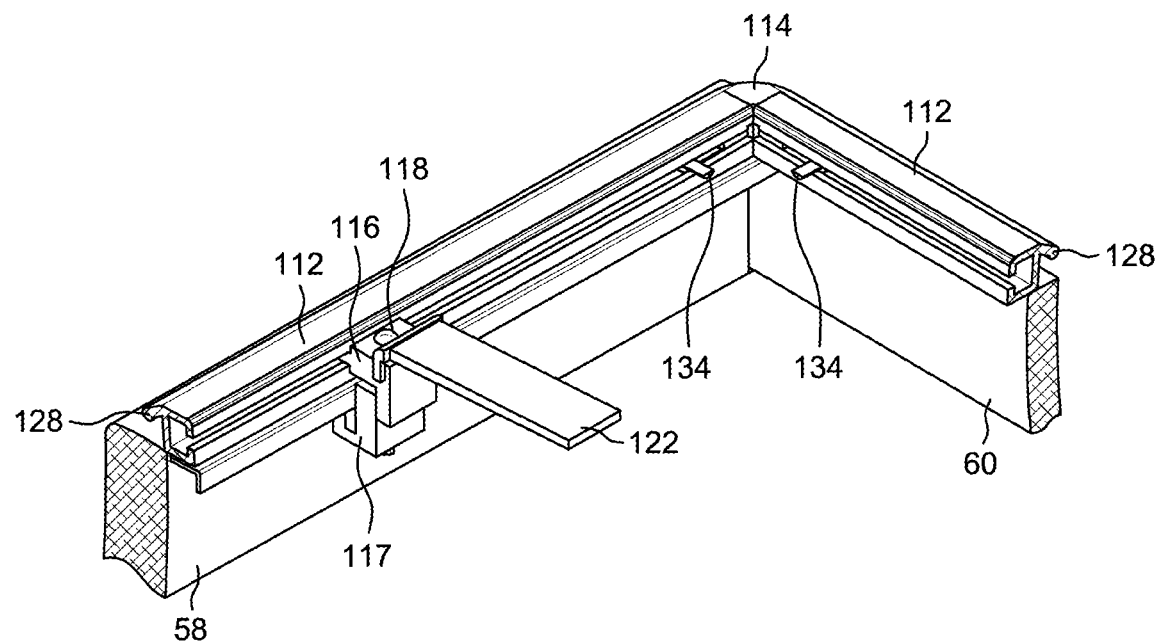
FIG. 7 shows a fragmentary view of some of the components of a corner assembly of the tonneau cover system of FIG. 1.

Referring now to FIGS. 5, 6, and 7, where like reference numerals depict like components, the elongated rail members 112 are joined using the rail frame corners 114 to form a rail frame assembly. In an embodiment, the rail frame assembly is rectangular. The rail frame corners 114 comprise insert portions 115 that are configured and adapted to be received into channels formed in the ends of the elongated rail members 112. The rail frame corners 114 lock two adjacent elongated rail members 112 at a right angle using cantilevered and flexible lift locks 134 that engage notches 132 in the elongated rail members 112. The elongated rail members 112 and the rail frame corners 114 each include a cantilevered male projection 128 that extends outwardly. Moreover, when assembled, the elongated rail members 112 and the rail frame corners 114 form a rectangular frame assembly, where the cantilevered male projection 128 extends around the entirety of the rectangular frame. As will be described in more detail hereinafter, the cantilevered male projection 128 provides an attachment point for the cover 102 to the frame assembly.

The elongated rail members 112 (the frame assembly) are joined to the top of the sidewalls (56, 58 and 60) of the truck bed 54 using clamp assemblies, each clamp assembly comprising an upper clamp 116, a lower clamp 117, and a fastener 118. The clamp assemblies clamp the elongated rail members 112 to a cantilevered portion of the sidewalls (56, 58, and 60). The support bows 122 are attached to the upper clamps 116 using an insert member 130 (FIG. 5). It will be appreciated that the bows 122 provide support for the cover 102 when the cover 102 is positioned in a retracted position as shown in FIG. 1. When installed, bows 122 provide an arched structure that allows water, dust and debris to shed off the cover 102 of the tonneau system 100. That is, the bows 122 may impart a slightly rounded shape to the cover 102 as shown in FIG. 1. Thus, as used herein, the term "substantially flat" is understood both flat and slightly rounded shapes.

Figure 8:
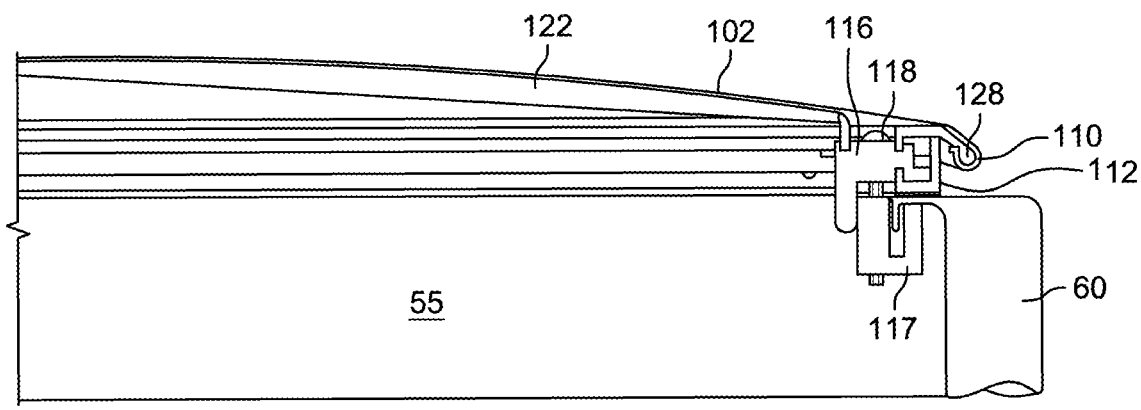
FIG. 8 shows a fragmentary and cross-sectional view of the tonneau cover system of FIG. 1 with the cover in an unstretched position.

Referring now to FIG. 8, where like reference numerals depict like components, the edges of the cover 102 of the tonneau cover system 100 are permanently secured to the friction fit seal 110. In an embodiment, the cover 102 and the friction fit seal 110 are permanently secured together using one of an adhesive, stitching, and locking alligator teeth. As observed, the friction fit seal 110 includes a J-shape end with an inner female channel configured and adapted to receive and hold the cantilevered male projections 128 of the elongated rail members 112 and the rail frame corners 114. Accordingly, the cover 102 is installed onto the elongated rail members 112 and the rail frame corners 114 by stretching the cover 102 taut and engaging the friction fit seal 110 to the cantilevered male projection 128. It will be appreciated that the friction fit seal 110 and the cantilevered male projection 128 form a seal that is weather, water and debris tight. In this manner, the cover 102 encloses the cargo compartment 55 both in the flat and stretched position as shown in FIGS. 1 and 2. Again, the support bows 122 provide under support for the cover 102 when configured as is shown in FIG. 1.

Figure 9:
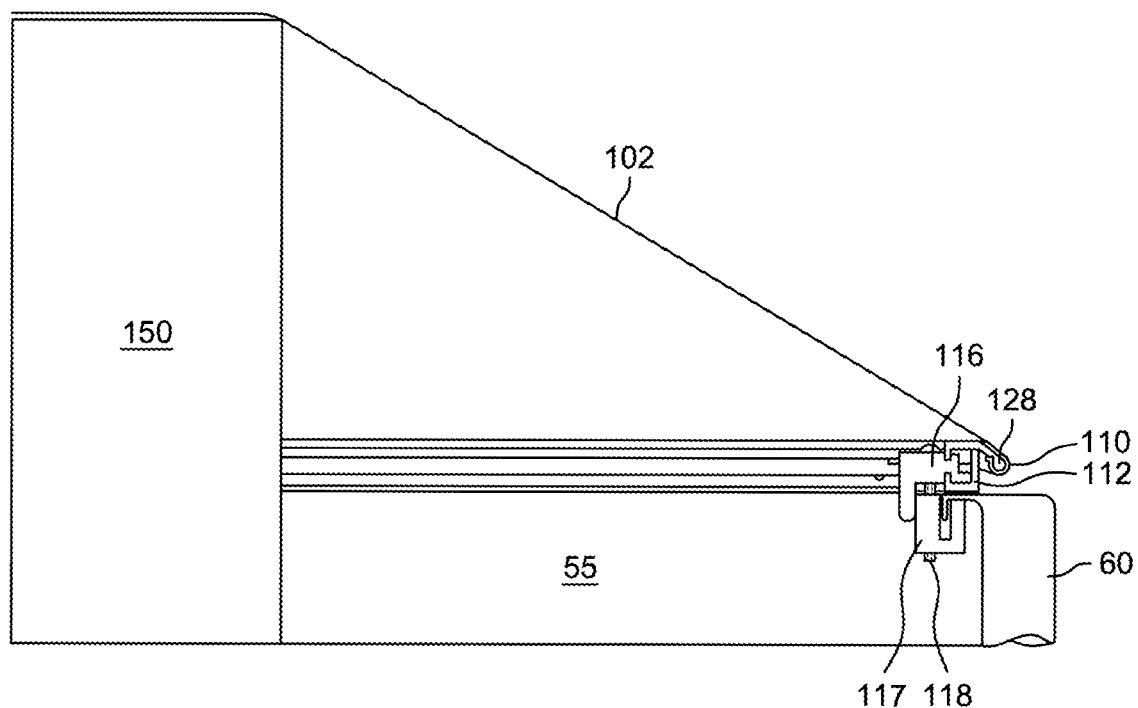
FIG. 9 shows a fragmentary and cross-sectional view of the tonneau cover system of FIG. 1 with the cover in a stretched position over cargo in the vehicle cargo bed.

Referring to FIG. 9, where like reference numerals depict like components, there is shown a latitudinal cross section of the tonneau system 100 attached to the truck bed 54. As shown, the cover 102 is configured to a stretched position to accommodate the cargo 150 in the cargo compartment 55. That is, when the cargo 150 is installed in the cargo compartment 55, the cover 102 stretches to accommodate the cargo 150 as is also shown in FIG. 2. In this configuration, the support bows 122 may be removed to accommodate the cargo 150. In an embodiment, the cover 102 may stretch vertically above the tops of the sidewalls by up to, and even exceeding, half the width of the cover 102 as measured from the cover 102 left side and right side. In an embodiment, the cover 102 may stretch vertically above the tops of the sidewalls by up to, and even exceeding, three quarters of the width of the cover 102 as measured from the cover 102 left side and right side. In an embodiment, the cover 102 may stretch vertically above the tops of the sidewalls by up to, and even exceeding, the entire width of the cover 102 as measured from the cover 102 left side and right side.

In an embodiment, the cover 102 is formed of a composite material having multiple layers, which may include: (a) one or more impervious layers of a rubber-like material, e.g., synthetic rubber, closed cell foam, open cell foam, silicone, neoprene, or other material, that is able to stretch in one or more dimensions; and (b) one or more reinforcing layers that is able to stretch in one or more dimensions. The layers of the cover 102 can be in any order. The stretchability and thickness of the cover 102 may vary depending on the layer types and thicknesses. The cover 102 may be formed from one or more sheets of a rubber-like material, e.g., synthetic rubber, closed cell foam, open cell foam, silicone, neoprene, or other material. In an embodiment, the cover 102 is formed from sheets of an open cell or closed cell stretchable material.

Figure 10:
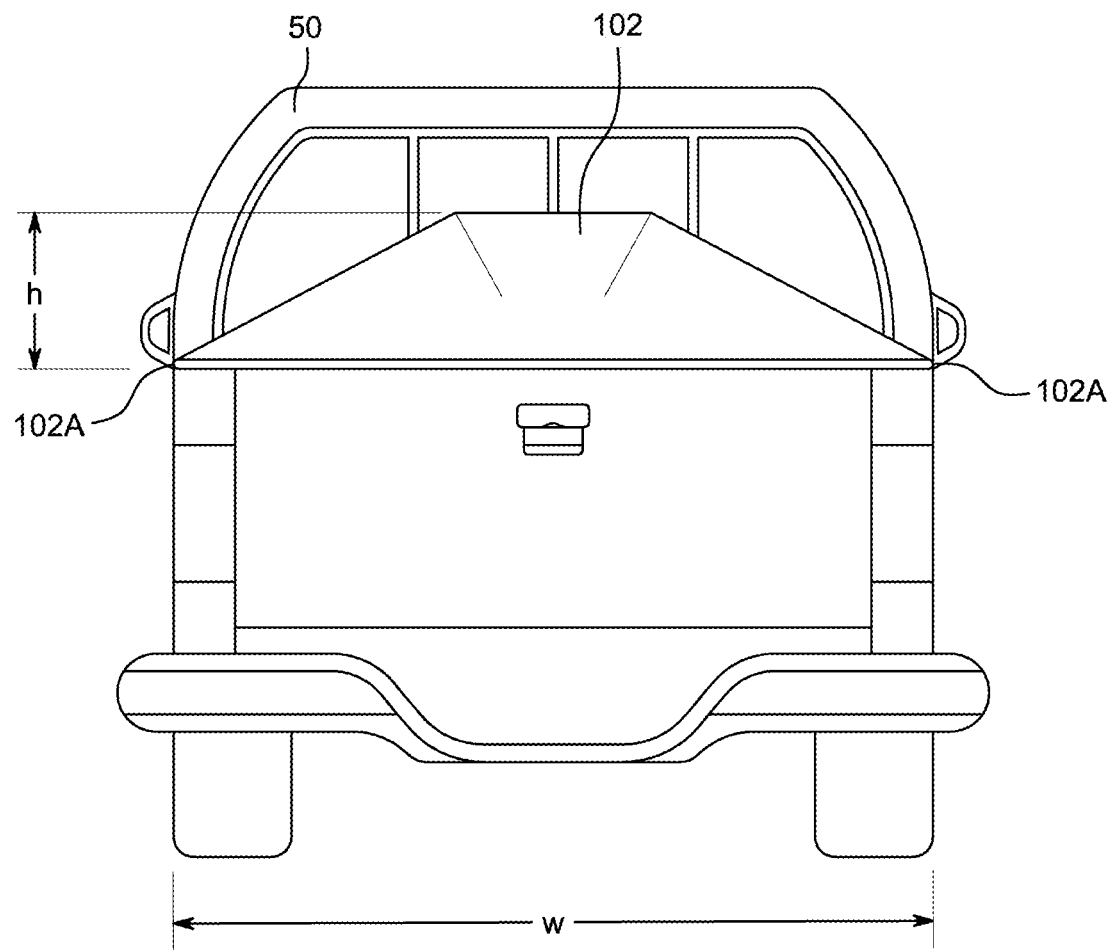
FIG. 10 shows a tonneau cover installed on a vehicle and depicts the stretch height and width of the tonneau cover.

Referring now to FIG. 10, the cover 102 may have a stretch ratio defined as follows:

$$\frac{h}{w}$$

where the w is the width of the cover 102 measured from a left-side or first edge (driver side) 102A of the cover 102 and to a right-side or second edge (passenger side) 102B of the cover 102 and where h is the vertical stretched height of the cover 102 measured vertically from the cover 102 positioned an unstretched or flat position (see FIG. 1). That is, the height, h, is a measurement of the displacement of the cover 102 from a flat position to a stretched position. A value of the stretch ratio is at least 0.1, at least 0.2, at least 0.3, at least 0.4, at least 0.5, at least 0.6, at least 0.7, at least 0.75, at least 0.8, at least 0.9, or at least 1.0. In an embodiment, the width, w, of the cover 102 is at least one foot, two feet, four feet, at least five feet, at least six feet, at least seven feet, or at least eight feet. In an embodiment, the width, w, may be the length of the cover 102 measured from the front edge to the back edge of the cover 102. The width, w, may be a distance between two opposing side edges of the cover 102, such as the distance between the left and right sides of the cover 102 or the distance between the front and rear edges of the cover 102.

Figure 11:
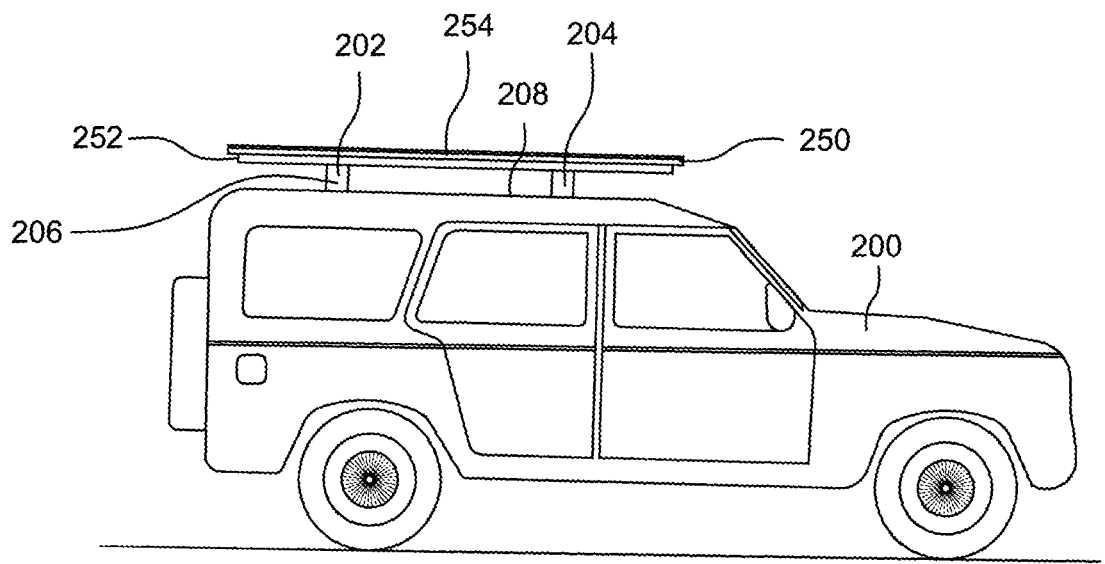
FIG. 11 shows a cargo carrier with a stretchable cover mounted to a roof rack of a vehicle.

Referring to FIG. 11, there is shown a vehicle 200 having a roof rack 202 with a front rack 204 and a rear rack 206 secured to a roof 208 of the vehicle 200. Mounted on the roof rack 202 is a cargo carrier 250. The cargo carrier 250 may include a frame assembly 252. The frame assembly 252 may be integral with a solid base so that does not contact the roof of the vehicle 200. For example, the solid base may comprise a molded plastic tub. The frame assembly 252 may be clamped to the front rack 204 and the rear rack 206 with clamps. The frame assembly 250 may be rectangular, circular, oval, or dished and be formed by elongated rail members and rail frame corners similar in configuration to the elongated rail members 112 and rail frame corners 114 as shown in the preceding figures.

Secured to its edges, the cover 254 may have a friction fit seal similar to the friction fit seal 110 described above. A stretchable tonneau cover 254 may be installed onto the frame assembly 252 in a similar manner as described above such that when cargo is absent from the cargo compartment of the cargo carrier 250, the tonneau cover 254 may lay substantially flat as shown in FIG. 11.

Figure 12:
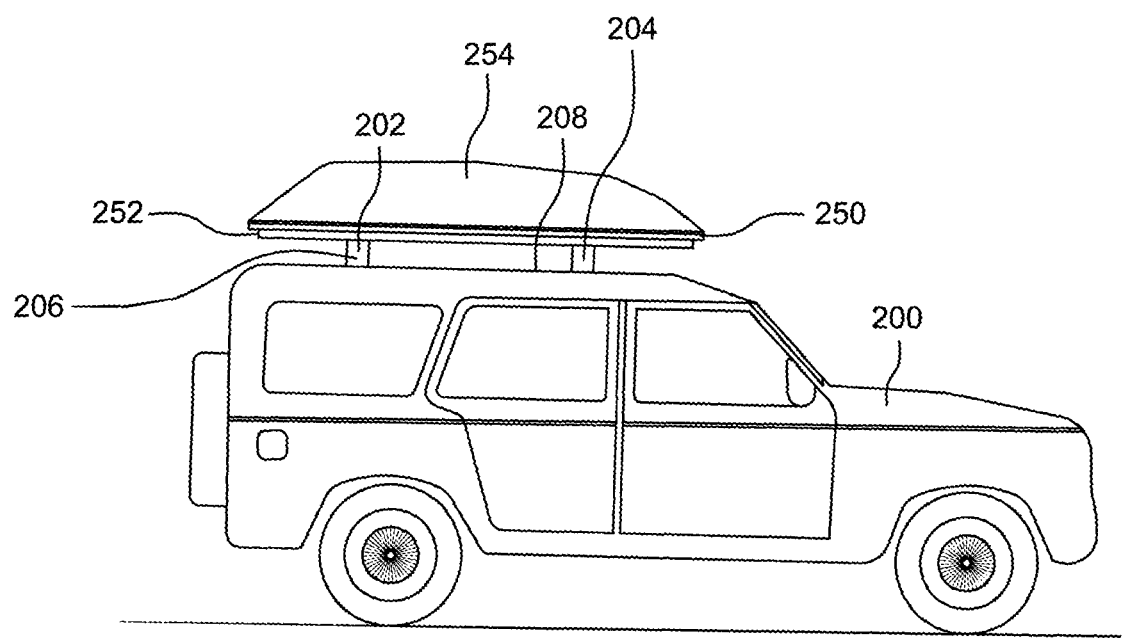
FIG. 12 shows the cargo carrier of FIG. 11 loaded with cargo and the stretchable cover stretched over the cargo.

As shown in FIG. 12, cargo may be loaded into the cargo compartment of the cargo carrier 250. The tonneau cover 254 may be stretched over the cargo and attached to the frame assembly 252 in a similar manner as the tonneau cover 102 is attached to the elongated rail members 112 and rail frame corners 114 as shown in the preceding figures. The tonneau cover 254 may have the same composition and stretchability of the tonneau cover 102 as described above.

EXAMPLES

The following examples pertain to further embodiments.

Example 1 is a tonneau system for a cargo compartment of a vehicle that comprises a tonneau frame assembly; a tonneau cover connected to the tonneau frame assembly; and where the tonneau cover comprises an elastic material, such as a synthetic rubber or rubber-like material.

In Example 2, the system of Example 1 further comprises that the tonneau cover comprises a first side edge and a second side edge; where the first side edge and the second side edge are on opposite sides of the cover and, optionally, are parallel; wherein a distance between the first side edge and the second side edge defines a tonneau cover width, w; where the width, w, is at least four feet; where the tonneau cover is operable between a flat position and a stretched position; where a displacement of the tonneau cover between the flat position and the stretched position defines a tonneau cover stretch height, h; where a stretch ratio is defined by $$\frac{h}{w}$$

is at least 0.1.

In Example 3, the system of Example 2, where the ratio is at least 0.2.

In Example 4, the system of Example 2, where the ratio is at least 0.3.

In Example 5, the system of Example 2, where the ratio is at least 0.4.

In Example 6, the system of Example 2, where the ratio is at least 0.5.

In Example 7, the system of Example 2, where the ratio is at least 0.6.

In Example 8, the system of Example 2, where the ratio is at least 0.7.

In Example 9, the system of Example 2, where the ratio is at least 0.75.

In Example 10, the system of Example 2, where the ratio is at least 0.8.

In Example 11, the system of Example 2, where the ratio is at least 0.9.

In Example 12, the system of Example 2, where the ratio is at least 1.0.

In Example 13, the system of any of Examples 1-12, where the elastic material is an elastomeric material.

In Example 14, the system of any of Examples 1-13, where the tonneau cover is characterized by an absence of expandable folds.

In Example 15, the system of any of Examples 1-14, where the elastic material comprises one or more of neoprene, cell foam, open cell foam, closed cell foam, or other waterproof stretchable material.

In Example 16, the system of any of Examples 1-15, where the elastic material comprises a first layer and a second layer, where the first layer is formed of a synthetic rubber material and the second layer is formed of a reinforcement material.

Example 17 is a tonneau system for a cargo compartment of a vehicle that comprises a tonneau frame assembly comprising a plurality of elongated rail members arranged in a rectangular shape; a cantilevered male projection extending around a perimeter of the rectangular shape of the tonneau frame assembly; a tonneau cover having a friction fit seal disposed along an outside perimeter; the friction fit seal having a channel for receiving the cantilevered male projection; wherein the tonneau cover comprises an elastic material; wherein the tonneau cover comprises a first side edge and a second side edge; where the first side edge and the second side edge are on opposite sides of the cover; wherein a distance between the first side edge and the second side edge defines a tonneau cover width, w; wherein the width, w, is at least four feet; wherein the tonneau cover is operable between a flat position and a stretched position; wherein a displacement of the tonneau cover between the flat position and the stretched position defines a tonneau cover stretch height, h; wherein a stretch ratio is defined by $$\frac{h}{w}$$

is at least 0.1.

In Example 18, the system of Example 17, where the ratio is at least 0.2.

In Example 19, the system of Example 17, where the ratio is at least 0.4.

In Example 20, the system of Example 17, where the ratio is at least 0.5.

In Example 21, the system of Example 17, where the ratio is at least 0.6.

In Example 22, the system of Example 17, where the ratio is at least 0.75.

In Example 23, it is a method of securing cargo in a bed of a pick-up truck, the bed having a front sidewall, a right sidewall, a left sidewall, and a rear sidewall, the method comprising: removing, at least partially, a tonneau cover from a frame assembly installed onto a top surface of each of the front sidewall, right sidewall and left sidewall by disconnecting the tonneau cover from the frame assembly; placing cargo in the bed; and reinstalling the tonneau cover onto the frame assembly by stretching the tonneau cover over the cargo and reattaching the tonneau cover to the frame assembly.

In Example 24, the method of Example 23, wherein the tonneau cover comprises a first side edge and a second side edge; wherein the first side edge and the second side edge are on opposing sides of the cover, wherein a distance between the first side edge and the second side edge defines a tonneau cover width, w; wherein the width, w, is at least four feet; wherein the tonneau cover is operable between a flat position and a stretched position when installed onto the frame assembly; wherein a displacement of the tonneau cover between the flat position and the stretched position defines a tonneau cover stretch height, h; wherein a stretch ratio is defined by $$\frac{h}{w}$$

is at least 0.1.

In Example 25, the method of Example 24, wherein the stretch ratio is at least 0.25.

In Example 26, a system for securing cargo in an open top cargo compartment, the system comprising: a frame assembly; a cover connected to the frame assembly; and wherein the cover comprises a sheet of an elastic material.

It will be appreciated that the present invention can be utilized on a wide variety of vehicles, including pickup trucks, trailers, military vehicles, or any other type of vehicle with an exposed cargo space. As used herein, the term "elastomeric material" refers to a material that comprises an elastomer, e.g., an elastic substance occurring naturally, as natural rubber, or produced synthetically, as butyl rubber, neoprene, cell foam, closed cell, open cell phone, or other stretchable, water proof material.

It will be appreciated that the structure and apparatus disclosed herein is merely one example of a means for expanding a tonneau cover, and it should be appreciated that any structure, apparatus or system for expanding a tonneau cover which performs functions the same as, or equivalent to, those disclosed herein are intended to fall within the scope of a means for expanding a tonneau cover, including those structures, apparatus or systems for expanding a tonneau cover which are presently known, or which may become available in the future. Anything which functions the same as, or equivalently to, a means for expanding a tonneau cover falls within the scope of this element.

Those having ordinary skill in the relevant art will appreciate the advantages provide by the features of the present disclosure. For example, it is a feature of the present disclosure to provide a tonneau cover that is operable between a collapsed position and an expanded position that is characterized by the absence of folds. It is further a feature to provide a tonneau cover with self-retracting means.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A system for securing cargo in an open top cargo compartment of a truck bed, the truck bed having sidewalls, comprising:
   a frame assembly mountable to the sidewalls of the truck bed, the frame assembly having a pair of opposing sides;
   the frame assembly further having support bows extending between the opposing sides; and
   a cover connected to the frame assembly;
   wherein the cover comprises a sheet of an elastic material;
   wherein the cover comprises a first side edge and a second side edge;
   wherein the first side edge and the second side edge are disposed on opposing sides of the cover;
   wherein a distance between the first side edge and the second side edge defines a cover width, w;
   wherein the cover is operable between a substantially flat position and a stretched position;
   wherein the cover is supported in the substantially flat position by the support bows;
   wherein the support bows are removed when the cover is in the stretched position;
   wherein a stretched portion of the cover is above a top-most surface of the sidewalls of the truck bed in the stretched position;
   wherein a vertical displacement of the cover between the substantially flat position and the stretched position defines a cover stretch height, h;
   wherein a stretch ratio for the cover defined by $$\frac{h}{w}$$

is at least 0.1;
   wherein the width, w, is at least four feet;
   wherein the cover is operated to the stretched position in response to the cargo pressing against an underside of the cover;
   wherein the cargo extends above the top-most surface of the sidewalls of the truck bed;
   wherein the cover exerts a compressive force on the cargo.

2. The system of claim 1, wherein the stretch ratio is at least 0.2.

3. The system of claim 1, wherein the stretch ratio is at least 0.3.

4. The system of claim 1, wherein the stretch ratio is at least 0.4.

5. The system of claim 1, wherein the stretch ratio is at least 0.5.

6. The system of claim 1, wherein the stretch ratio is at least 0.6.

7. The system of claim 1, wherein the stretch ratio is at least 0.75.

8. The system of claim 1, wherein the elastic material is an elastomeric material.

9. The system of claim 1, wherein the cover is characterized by an absence of expandable folds.

10. The system of claim 1, wherein the elastic material comprises one of neoprene, open cell foam, closed cell foam, rubber, and silicone.

11. The system of claim 1, wherein the elastic material comprises a sheet having a first layer and a second layer, wherein the first layer is formed of an elastic material.

12. A system for securing cargo in a truck bed having sidewalls comprising:
   a frame assembly comprising a plurality of elongated rail members arranged in a rectangular shape, the frame assembly configured and dimensioned to mount to the sidewalls of the truck bed;
   a cantilevered male projection extending around a perimeter of the rectangular shape of the frame assembly;
   a cover having a friction fit seal disposed along an outside perimeter;
   the friction fit seal having a channel for receiving the cantilevered male projection;
   wherein the cover comprises an elastic material;
   wherein the cover comprises a first side edge and a second side edge that are disposed on opposing sides of the cover;
   wherein a distance between the first side edge and the second side edge defines a cover width, w;

wherein the cover is operable between a flat position and a stretched position;

wherein a stretched portion of the cover is above a top-most surface of the sidewalls of the truck bed in the stretched position;

wherein a displacement of the cover between the flat position and the stretched position defines a cover stretch height, h;

wherein a stretch ratio of the cover defined by $$\frac{h}{w}$$

is at least 0.1;

wherein the width, w, is at least four feet;

wherein the cover is operated to the stretched position in response to the cargo pressing against an underside of the cover;

wherein the cargo extends above the top-most surface of the sidewalls of the truck bed;

wherein the cover exerts a compressive force on the cargo.

13. The system of claim 12, wherein the stretch ratio is at least 0.2.

14. The system of claim 12, wherein the stretch ratio is at least 0.4.

15. The system of claim 12, wherein the stretch ratio is at least 0.6.

16. The system of claim 12, wherein the stretch ratio is at least 0.75.

17. A method of securing cargo in a bed of a pick up truck, the bed having sidewalls, the method comprising:

removing, at least partially, a tonneau cover from a frame assembly installed to the sidewalls by disconnecting the tonneau cover from the frame assembly;

placing cargo in the bed of the truck, the cargo extending above the sidewalls of the bed; and reinstalling the tonneau cover onto the frame assembly by stretching the tonneau cover over the cargo and reattaching the tonneau cover to the frame assembly such that the tonneau cover is stretched from a flat position to a stretched position in response to the cargo pressing against an underside of the cover;

wherein the cover exerts a compressive force on the cargo.

18. The method of claim 17, wherein the tonneau cover comprises a first side edge and a second side edge, the first side edge and the second side edge disposed on opposite sides of the tonneau cover;

wherein a distance between the first side edge and the second side edge defines a tonneau cover width, w;

wherein the tonneau cover is operable between a flat position and a stretched position;

wherein a displacement of the tonneau cover between the flat position and the stretched position defines a tonneau cover stretch height, h;

wherein a stretch ratio of the tonneau cover defined by $$\frac{h}{w}$$

is at least 0.1;

wherein the width, w, is at least four feet.

19. The method of claim 18, wherein the stretch ratio is at least 0.25.

* * * * *